US 6,698,871 B1

(12) United States Patent
Hayashi et al.

(10) Patent No.: US 6,698,871 B1
(45) Date of Patent: Mar. 2, 2004

(54) INK-CONTACTING MEMBER, INK-ABSORBING MEMBER, INK TANK AND INK-JET CARTRIDGE, AND INK-JET RECORDING APPARATUS USING THE SAME

(75) Inventors: Hiroki Hayashi, Yokohama (JP); Hajime Yamamoto, Yokohama (JP); Eiichiro Shimizu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,137

(22) Filed: Dec. 21, 1998

(30) Foreign Application Priority Data

Dec. 26, 1997 (JP) ................................. 9-366982

(51) Int. Cl.[7] ................................. B41J 2/175
(52) U.S. Cl. ........................... 347/86; 347/87
(58) Field of Search ............... 347/85, 86, 87; 521/50; 528/485; 428/411.1

(56) References Cited

U.S. PATENT DOCUMENTS

| 5,509,140 A | 4/1996 | Koitabashi et al. | ........... 347/86 |
| 5,742,311 A | 4/1998 | Koitabashi et al. | ........... 347/86 |
| 6,015,210 A | * 1/2000 | Kanematsu et al. | ........... 347/87 |
| 6,051,681 A | * 4/2000 | Dozeman et al. | ........... 528/485 |
| 6,132,879 A | * 10/2000 | Tamura et al. | ........... 428/411.1 |

FOREIGN PATENT DOCUMENTS

| GB | 2181391 | 4/1987 |
| JP | 62-60653 | 3/1987 |
| JP | 63-216752 | 9/1988 |
| JP | 5-8405 | 1/1993 |
| JP | 9-67501 | 3/1997 |
| WO | 96/5140 | 2/1996 |

OTHER PUBLICATIONS

Application No. 09/132,746, filed Aug. 12, 1998 (GAU 1771).

* cited by examiner

Primary Examiner—Anh T. N. Vo
(74) Attorney, Agent, or Firm—Fitzpatrick, Cella, Harper & Scinto

(57) ABSTRACT

Disclosed herein is an ink-contacting member used in an ink-jet recording apparatus, which comprises, as a principal component, a polyolefin obtained by adding a hydrotalcite-like compound as a neutralizer.

28 Claims, 3 Drawing Sheets

INK-CONTACTING MEMBER, INK-ABSORBING MEMBER, INK TANK AND INK-JET CARTRIDGE, AND INK-JET RECORDING APPARATUS USING THE SAME

BACKGROUND OF THE INVENTION

1. Field of the Invention

The present invention relates to members with which an ink comes into contact, namely to ink-contacting members, such as an ink-absorbing member, ink tank and ink cartridge, and an ink-jet recording apparatus utilizing the above.

2. Related Background Art

An ink-jet recording apparatus has heretofore had a general construction that an ink tank for storing an ink therein, and an ink ejection part for ejecting the ink from the ink tank are connected to each other directly or through an ink-feeding member such as a tube. In such an ink-jet recording apparatus, members always coming into contact with an ink are required to have an excellent resistance to corrosion from the ink and not to cause such deterioration in performance as impurities in the members are dissolved out in the ink during long-term storage to deteriorate the performance of the ink or as the members themselves react with the ink to become fragile.

As a material for forming the ink tank, there has heretofore been used a resin material, metallic material, rubber material or the like. Of these materials, a polyolefin, which is a resin material, has been preferably used from the viewpoints of cost, processability, resistance to chemicals and easy recycling. Examples of the polyolefin include polypropylene and polyethylene. A catalyst such as the Ziegler-Natta catalyst is generally used in polymerization of an olefin upon the production of these polyolefins, and so a catalyst residue such as a chlorine compound remains in a polymer formed. The catalyst residue remaining in the polymer has a possibility of corroding or deteriorating the polymer. For example, it may cause yellowing of the polymer. Therefore, it is common to add a neutralizer into the polymer for allowing the neutralizer to react with the catalyst residue to neutralize it.

As the neutralizer, calcium stearate has heretofore been used very widely. The neutralizer is generally added in an amount of from 1,000 to 1,500 ppm to the polymer though the amount varies according to the grade or the like of the polymer. As disclosed in Japanese Patent Application Laid-Open Nos. 62-60653 and 63-216752, it has however been known that this calcium stearate reacts with a sodium ion contained in an ink while being in contact with the ink for a long period of time to form a fibrous suspended matter, and the suspended matter causes a problem of impeding the flowability of the ink. In order to solve such a problem, there has been proposed a method in which calcium carbonate or magnesium carbonate is used as a neutralizer (refer to Japanese Patent Application Laid-Open No. 62-60653) or a method in which an amount of a fatty acid or its derivative, such as calcium stearate, to be added into the whole material for constructing an ink tank is reduced to 100 ppm or lower (refer to Japanese Patent Application Laid-Open No. 63-216752).

Even in images formed by an ink-jet recording method, a photograph-like print quality has been recently pursued, and it has thus been required to output a clearer color image. In keeping with such a requirement, various performance characteristics or properties such as excellent coloring ability, and high fastness and water fastness have been required of inks, and performance requirements also have become severe. For example, it is required to make ink droplets ejected minuter, and to enhance the precision of ink-droplet impact on the surface of paper. Accordingly, the influence of substances dissolved out in an ink from members coming into contact with the ink on the ink also becomes more intensified than before. Therefore, the dissolving-out of a trace amount of impurities in an ink, which did not become a problem in the conventional ink-contacting member system, has come up as a new problem.

According to researches by the present inventors, it has been confirmed that when an ink tank using an ink-absorbing member made of a polyolefin is stored at a high temperature or left to stand for a long period of time, the quality of an image formed with an ink contained in the ink-absorbing member is deteriorated. Upon analyzing this problem, the following fact has been become clear. Namely, when the polyolefin is formed into a film or sheet, calcium stearate contained in the polyolefin generally tends to migrate to the surface thereof, and is ease to bleed out. According to the analysis by the present inventors, besides the above, the fact that calcium stearate in the polyolefin becomes easy to be dissolved out in the ink when it is heated has become clear.

When calcium stearate is heated at a temperature exceeding 130° C., its crystallinity is decayed, and the crystallinity remains decayed even after the temperature is lowered. When such calcium stearate comes into contact with an ink, it is ion-exchanged by a sodium ion or the like in the ink and dissolved out in the ink. In particular, it has been confirmed that when the polyolefin containing calcium stearate is subjected to a thermal hysteresis at 60° C. or higher in a state brought into contact with the ink, calcium stearate becomes easier to be dissolved out. In this state, calcium stearate is dissolved in the ink. Therefore, such problems that the flowability of the ink is impeded do not arise so far as a very great amount of calcium stearate is dissolved out. However, since the ink in which calcium stearate is dissolved is exposed to the air in the vicinity of an ink-ejection orifice, calcium stearate is deposited as impurities about the ejection orifice due to the evaporation of water in the ink. Therefore, when the ink is ejected, a portion of the orifice, to which the impurities have been attached, differs in wettability by the ink from surroundings thereof. As a result, the ejecting direction of the ink is changed, and an ink droplet impacts a position distant from an original position intended to impact, so that the quality of the resulting image (print quality) is deteriorated.

The neutralization reaction of a chlorine compound with calcium stearate, which is a neutralizer, is represented by a reaction scheme

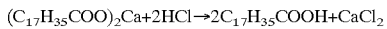

$$(C_{17}H_{35}COO)_2Ca + 2HCl \rightarrow 2C_{17}H_{35}COOH + CaCl_2$$

and hydrochloric acid is neutralized according to such a reaction. Since stearic acid and calcium chloride, which are products by this reaction, exhibit weak corrosive properties, there is a possibility that a new problem may be offered in view of the future trend of ink-jet recording apparatus toward photograph-like printing with high definition and optical density. Therefore, it is desired that such products should not exhibit corrosive properties, if possible.

It is also preferred that, besides the neutralizer, an antioxidant be added to the polyolefin for stabilizing its quality. The antioxidant is added for the purpose of preventing the quality of the plastic from being deteriorated by corrosion or the like by oxidation. The antioxidant may be generally classified into a primary antioxidant and a secondary antioxidant. The primary antioxidant serves to prevent an oxidative deterioration reaction by a radical generated in a polymer from occurring as a chain reaction. Phenolic antioxidants and amine type antioxidants correspond thereto. The secondary antioxidant serves to decompose a peroxide generated in the polymer in such a manner that a radical is not generated. Sulfur-based antioxidants and phosphorus-based antioxidants correspond thereto.

When calcium stearate is added as a neutralizer to a polymer, however, the phosphorus-based antioxidant reacts with this calcium stearate to form calcium phosphate, and this product has a possibility that it may be dissolved out as impurities in an ink, and the impurities may cause a problem of deteriorating the print quality.

On the other hand, as disclosed in Japanese Patent Application Laid-Open No. 62-60653, there is an example in which calcium carbonate, magnesium carbonate or the like is used as a neutralizer in place of calcium stearate. Since the neutralizing action of a carbonate is not very high, however, the amount of the carbonate added becomes greater compared with calcium stearate. In a system using, for example, calcium carbonate, there is also a possibility that products having weak corrosive properties, such as calcium chloride, may be generated like the system using calcium stearate.

SUMMARY OF THE INVENTION

Accordingly, it is an object of the present invention to provide ink-contacting members for ink-jet recording apparatus, such as ink-absorbing members, ink tanks and ink-jet cartridges, which have farther an excellent resistance to contact with inks than before and are composed of a polyolefin obtained by using a neutralizer by which an amount to be added may be smaller, and which is chemically stable and does not form any product having a possibility of causing a problem in future even after a catalyst residue is neutralized.

The above object can be achieved by the present invention described below.

According to the present invention, there is thus provided an ink-contacting member used in an ink-jet recording apparatus, which comprises, as a principal component, a polyolefin obtained by adding a hydrotalcite-like compound as a neutralizer.

According to the present invention, there is also provided an ink-absorbing member capable of holding an ink to be fed to an ink-jet head therein, which comprises, as a principal component, a polyolefin obtained by adding a hydrotalcite-like compound as a neutralizer.

According to the present invention, there is further provided an ink tank comprising an ink-absorbing member capable of holding an ink therein, and a case body housing the ink-absorbing member therein and having an opening part communicating with the air, wherein the ink-absorbing member comprises, as a principal component, a polyolefin obtained by adding a hydrotalcite-like compound as a neutralizer.

According to the present invention, there is still further provided an ink-jet cartridge comprising an ink-absorbing member capable of holding an ink therein, an ink tank housing the ink-absorbing member therein, and a printing head for ejecting the ink to be fed from the ink tank, wherein the ink-absorbing member comprises, as a principal component, a polyolefin obtained by adding a hydrotalcite-like compound as a neutralizer.

According to the present invention, there is yet still further provided an ink tank capable of storing an ink to be fed to an ink-jet head, wherein at least a part of the ink tank, with which an ink comes into contact, comprises, as a principal component, a polyolefin obtained by adding a hydrotalcite-like compound as a neutralizer.

According to the present invention, there is also still further provided an ink-jet recording apparatus comprising an ink-contacting member, wherein the ink-containing member comprises, as a principal component, a polyolefin obtained by adding a hydrotalcite-like compound as a neutralizer.

DETAILED DESCRIPTION OF THE PREFERRED EMBODIMENTS

Figure 1:
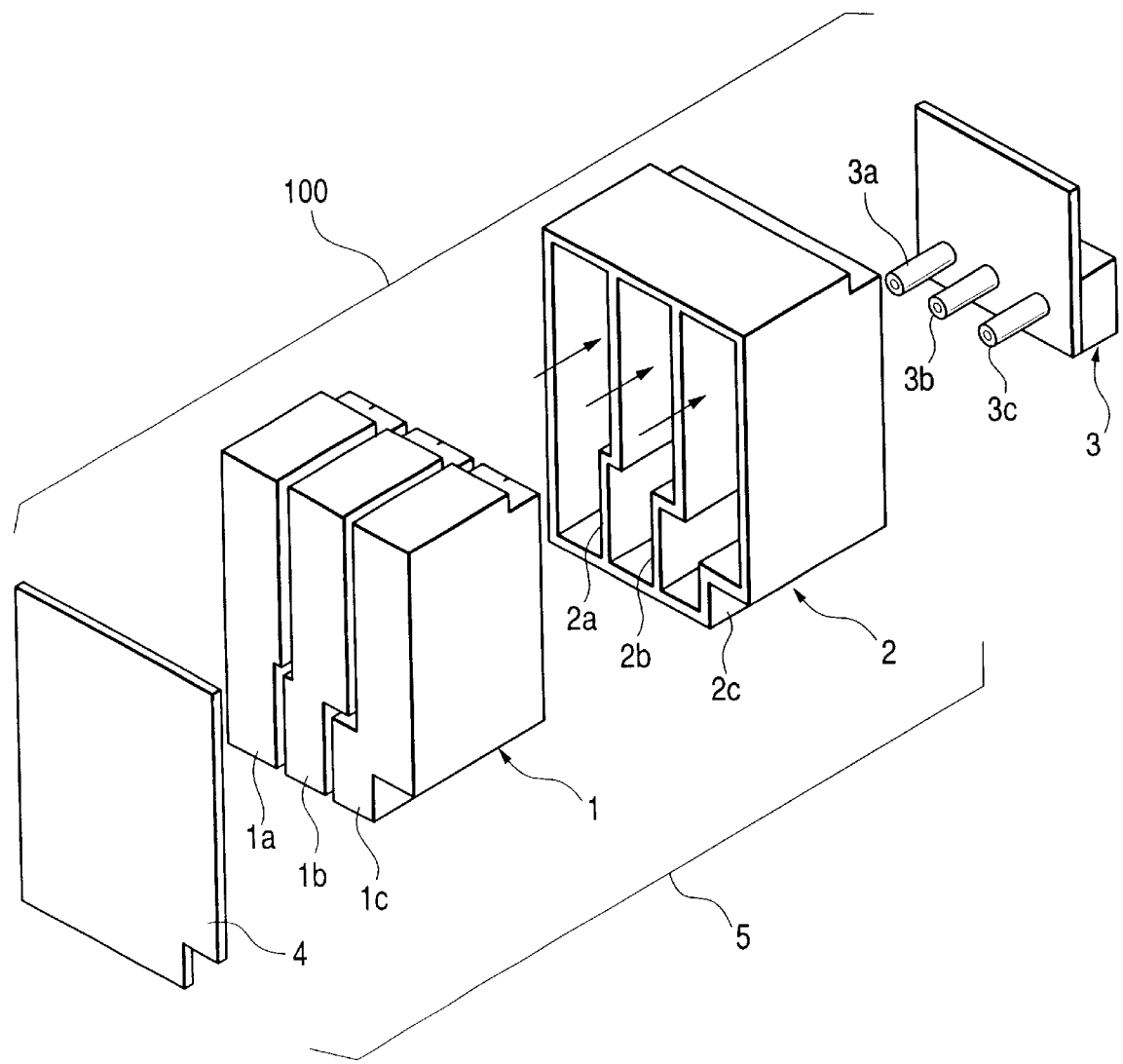
FIG. 1 is an exploded view in perspective of an ink-jet cartridge according to the present invention.

The present invention will hereinafter be described in more detail with reference to the preferred embodiments of the present invention.

The ink-contacting members according to the present invention, such as ink-absorbing members, ink tanks and ink-jet cartridges, comprise, as a principal component, a polyolefin obtained by adding a hydrotalcite-like compound as a neutralizer. Materials preferably used as the polyolefin in the present invention are polypropylene and polyethylene.

The hydrotalcite-like compound used in the present invention means a compound homologous of hydrotalcite.

The hydrotalcite-like compound used as a neutralizer in the present invention in place of the conventionally used calcium stearate will be described in more detail. The compound is a non-stoichiometric compound represented by a general formula

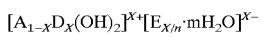
$[A_{1-x}D_x(OH)_2]^{x+}[E_{x/n} \cdot mH_2O]^{x-}$ wherein A is a divalent metal such as Mg, Mn, Fe, Co, Ni, Cu or Zn, D is a trivalent metal such as Al, Fe, Cr, Co or In, E is an n-valent anion such as OH, F, Cl, Br, $NO_3$, $CO_3$, $SO_4$, $Fe(CN)_6$ or $CH_3COO$, m is an integer, and X satisfies the relationship of $0 < X \leq 0.5$.

Of the hydrotalcite-like compounds represented by the above general formula, a compound represented by a general formula

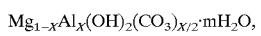
$Mg_{1-x}Al_x(OH)_2(CO_3)_{x/2} \cdot mH_2O$, in which X satisfies the relationship of $0 < X \leq 0.5$ and m is an integer, are particularly preferred. These compounds are generally stable and hence suitable for the achievement of the object of the present invention.

The neutralizing action of the hydrotalcite-like compound represented by the above general formula on catalysts will be described taking one of the above preferred compounds, i.e., the following compound, as a typical example. The neutralization reaction by this compound is conducted in accordance with a reaction scheme

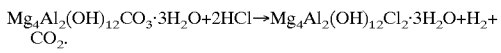

$CO_2$ which is a product of this reaction is neutral and exhibits no corrosive property. The chlorine ion is taken in the hydrotalcite moiety to be inactivated, and is not released up to about 400° C.

It goes without saying that the hydrotalcite-like compound itself, in which the chlorine ion has been taken, has high heat resistance and retains its crystalline structure up to about 300° C. Therefore, even when it undergoes a thermal hysteresis at a high temperature upon the molding or forming of the polyolefin, its properties are not changed. In addition, since the hydrotalcite-like compound has a high resistance to chemicals and begins to start dissolution at a pH of about 12 or higher or about 1 or lower, the dissolving-out of impurities into an ink from the molding scarcely occurs in view of the fact that the pH of ink is generally from about 7 to about 10. Further, the neutralization power of this compound is generally higher by about 3 times than calcium stearate. Accordingly, its amount to be added can also be reduced correspondingly.

Even if this compound involves no problem in a contacting property with inks as an ink-contacting material used in the field of ink-jet, however, there is a high possibility that the compound may be dissolved out in an ink by falling or the like from the ink-contacting member when such a compound is carelessly added in a great amount, so that the problem of impeding the flowability of the ink may be possibly caused. Therefore, the amount of the hydrotalcite-like compound added should be as little as possible. Taking the amount of a catalyst residue in the polyolefin into consideration, the amount of the hydrotalcite-like compound added is generally within a range of from 100 ppm to 1,000 ppm, preferably from 100 ppm to 500 ppm in the polyolefin though the amount varies according to the grade or the like of the polymer. If the amount of the hydrotalcite-like compound added is too much, it is preferred that a great amount of the hydrotalcite-like compound remaining in the polymer without undergoing a neutralization reaction be removed by washing in advance, and the thus-treated polymer be then molded or formed into a desired shape.

The polyolefin obtained by adding this hydrotalcite-like compound as a neutralizer for the sake of neutralizing a catalyst at the time of polymerizing a monomer can be formed or molded by any conventionally-known forming or molding method such as extrusion or injection molding into an ink-contacting member according to the present invention, such as an ink-absorbing member, ink tank case body, ink container bag or ink-feeding tube. Incidentally, no particular limitation is imposed on the individual forms of the various ink-contacting members formed, and they may be in any conventionally-known forms.

The preferred embodiments of the present invention will be described more specifically with reference to the accompanying drawings.

FIG. 1 is an exploded view in perspective schematically illustrating an ink-jet cartridge 100 equipped with an ink-absorbing member 1 formed in the above-described manner. Of the ink-contacting members, the contact area of the illustrated ink-absorbing members 1a, 1b and 1c, with an ink is far wider than other members such as a case body 2 making up an ink tank because the ink is held by the whole structure thereof. Therefore, impurities in the ink-absorbing member 1 are easy to be dissolved out in the ink and greatly affect the ink.

The ink-jet cartridge 100 is composed of an ink-jet head 3 from which inks of yellow (Y), magenta (M) and cyan (C) colors are separately ejected, and an ink tank 5 detachably installed to the ink-jet head 3. The ink-jet head 3 is connected to the ink tank 5 through ink-feeding tubes 3a, 3b and 3c provided correspondingly to the respective colors. The inks are fed to the ink-jet head 3 through their corresponding ink-feeding tubes. In the ink tank 5, the interior of a container making up the case body 2 together with a lid member 4 is partitioned into 3 chambers by partition members 2a and 2b, and the ink-absorbing members 1a, 1b and 1c, which respectively hold the Y, M and C inks therein, are received in the respective chambers. An opening part (not illustrated) communicating with the air is provided in each of the chambers so as to communicate the interior of the case body 2 with the air.

The external shape of the ink tank 5 is so designed that a recess 2c is provided in a part of the case body 2 for avoiding interference with the interior of an apparatus when the ink tank 5 is installed in the apparatus. From the viewpoint of the amount of ink to be contained, all the three chambers are shaped according to the recess 2c, and so the partition members 2a and 2b are formed so as to have a bent portion at a part thereof.

Figure 2:
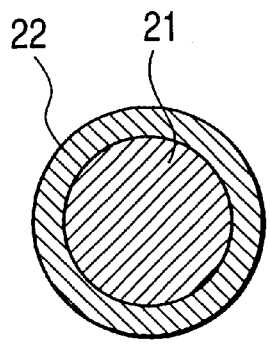
FIG. 2 is a cross-sectional view of a fiber making up an ink-absorbing member according to the present invention.

The ink-absorbing members 1a, 1b and 1c respectively positioned in regions surrounded by the case body 2 and partition members 2a and 2b of the ink tank 5 each have an external surface equivalent or corresponding to the configuration of the internal surface of its corresponding chamber in the case body 2 and are formed by compressing a composite fiber and thermosetting the surfaces thereof, so as to conform to the shapes of the respective chambers in the case body 2. The composite fiber is formed by covering a polypropylene core 21 with a polyethylene shell 22 at a weight ratio of 1:1 as illustrated in FIG. 2.

The production process of the ink tank 5 illustrated in FIG. 1 will now be described in brief.

First of all, a continuous, elastic fiber aggregate in the form of a rod or plate is molded from the above polyolefins. The continuous fiber aggregate is then cut by a cutter into standard units to form fiber masses. The fiber masses are inserted with pressing into a mold having a shape conforming to the internal configuration of the case body 2 (almost the same size as or a somewhat larger size than the case body), and then heated in a heating oven, thereby forming ink-absorbing members 1a, 1b and 1c. In this case, fiber masses may be inserted into each cavity of the mold corresponding to the form and size of the case body 2 to laminate them, and then thermoset. After that manner, the ink-absorbing members. 1a, 1b and 1c according to the form and size of the case body 2 may be formed with ease. The ink-absorbing members 1a, 1b and 1c are taken out of the mold and inserted into the case body 2, and the lid 4 is fitted, thereby completing the ink tank 5.

The temperature of the heating oven may be optional so far as it is higher than the melting point of the polyethylene fiber 22 as a shell, but lower than the melting point of the polypropylene fiber 21 as a core. For example, in the case where the melting point of the polyethylene fiber 22 is 132° C., it is preferred that the temperature of the heating oven be from 135° C. to 155° C. The heating time can be controlled according to necessary strength for the ink-absorbing members. The ink-absorbing members and case body are preferably formed with homogeneous materials from the viewpoint of recycle. When a label for identification is provided on the ink tank, the label is also preferably formed with a homogeneous material.

Figure 3A:
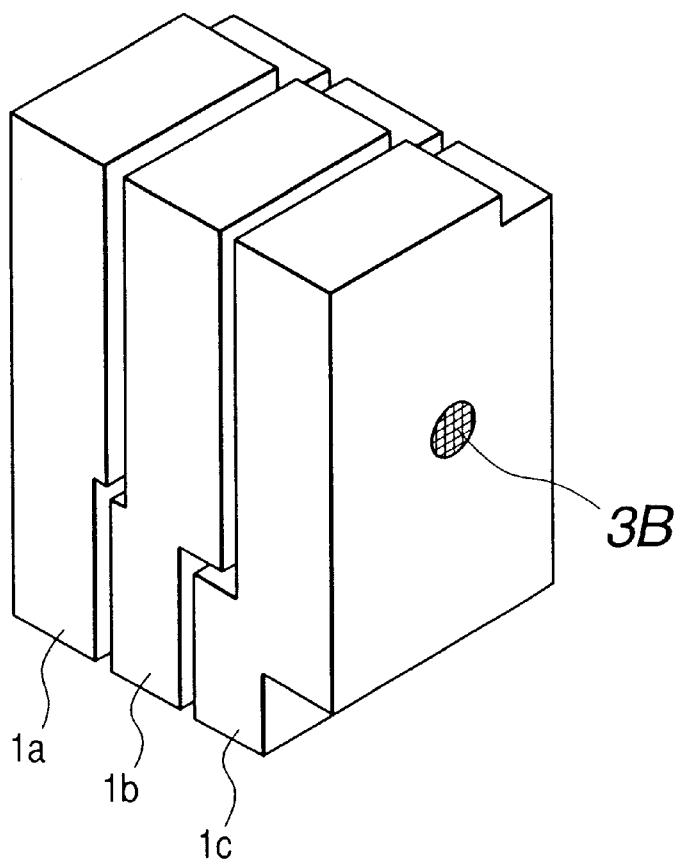
FIG. 3A is a conceptual view of an ink-absorbing member according to the present invention.
Figure 3B:
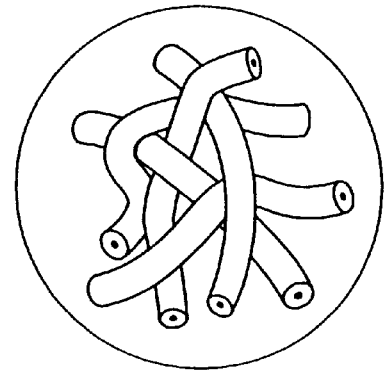
FIG. 3B is an enlarged view of a portion of the ink-absorbing member of FIG. 3A.

As illustrated in FIGS. 3A and 3B, the ink-absorbing members 1a, 1b and 1c according to this embodiment are so constructed that the polyethylene fiber is melted by applying heat to serve as an adhesive, and then three-dimensionally interlocking intersections of the polypropylene fibers are fixed, so that strength of the ink-absorbing members is generated. FIG. 3B is an enlarged view of a portion 3B of the ink-absorbing member in FIG. 3A.

At least one, preferably, all of the various ink-contacting members described above are formed mainly with a polyolefin obtained by adding the hydrotalcite-like compound according to the present invention as a neutralizer.

Figure 4:
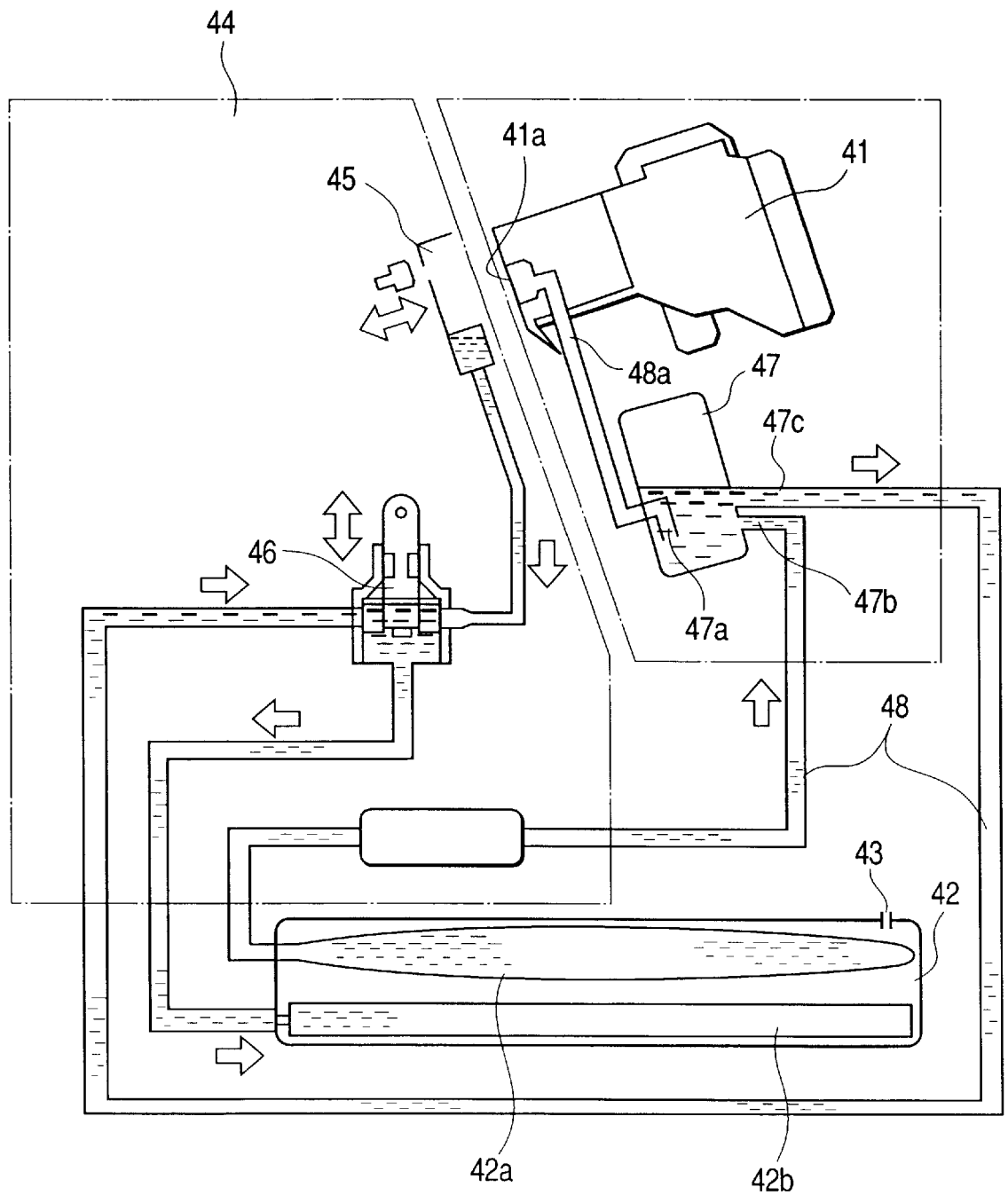
FIG. 4 is a conceptual view of an ink-jet recording apparatus using ink-contacting members according to the present invention.

FIG. 4 illustrates an exemplary ink-jet recording apparatus equipped with an ink tank having an ink container portion in the form of a bag. In FIG. 4, reference numeral 41 indicates a recording head having an ejection orifice 41a for ejecting an ink. This recording head 41 is mounted on a carriage (not illustrated) to conduct record scanning upon conducting recording on a recording medium or the like.

Reference numeral 42 indicates an ink tank replaceably installed in the recording apparatus, and 42a a flexible ink container bag for receiving an ink used in recording. Reference character 42b indicates a waste ink container portion for receiving a waste ink, which will be described subsequently. An opening part 43 communicating with the air is provided in the ink tank 42, whereby the change in shape of the bag-like ink container 42a with the consumption of the ink becomes feasible.

Reference numeral 44 indicates a recovery means for recovering an ink ejecting function, which is provided outside a record scanning region of the recording head 41 and has a cap 45 for covering an ink ejection orifice 41a. The recovery of the ink ejection orifice 41a is intended to solve clogging and the like at the ejection orifice 41a by subjecting an ejection opening part to suction through the cap 45 by means of a pump 46.

Reference numeral 47 indicates an ink subtank mounted on the carriage, on which the recording head is mounted, or the like. The ink subtank 47 is a temporary ink storage part provided in the course of an ink feed line for feeding the ink from the ink tank 42 to the recording head 41. An air layer is provided at the upper part within this ink subtank 47.

Reference character 47a designates an ink-feeding part for feeding the ink in the ink subtank 47 to the recording head 41, and 47b an ink inlet part for introducing the ink in the ink tank 42 into the ink subtank 47.

Reference character 47c indicates an outlet part for discharging air and/or the ink in the ink subtank 47 therefrom for controlling an ink quantity in the ink subtank 47. The outlet part 47c is provided so as to be located above the ink inlet part 47b in a direction of gravity. The above air layer is situated above the ink outlet part 47c. Incidentally, the discharge of the ink and/or the like from the ink subtank 47 is made by a pressure change caused by the pump 46.

The ink discharged from the ink subtank 47 and cap 45 by means of the pump 46 is stored in the waste ink container portion 42b through an ink tube 48.

In the ink subtank 47, an ink level is generally kept constant to maintain a difference of elevation from the recording head 41, thereby realizing stable generation of negative pressure. Since the ink subtank 47 is of a closed type, the ink is successively fed from the ink tank 42 to the recording head 41 through the ink tubes 48 and 48a. The rocking of the ink within the ink subtank 47 caused upon movement of the carriage due to record scanning or the like is reduced to some extent because the air layer has a damper-like effect.

In the above construction, at least one, preferably, all of the members with which an ink comes into contact, namely the various ink-contacting members, described above are formed mainly with a polyolefin obtained by adding the hydrotalcite-like compound according to the present invention as a neutralizer.

The present invention will hereinafter be described more specifically by the following examples. Examples 1 to 3 and Comparative Examples 1 to 3:

In a composite polyolefin fiber of a core and shell structure used in the formation of ink-absorbing members 1a, 1b and 1c illustrated in FIG. 1, polyethylene obtained by adding a hydrotalcite-like compound (DHT-4A, trade name, product of Kyowa Chemical Industry Co., Ltd.) represented by the formula $Mg_{1-X}Al_X(OH)_2(CO_3)_{X/2} \cdot mH_2O$, where X satisfies the relationship of $0<X\leq 0.5$ and m is an integer, in an amount of about 500 ppm was used as a material for the shell.

As materials for the core, there were provided 6 samples of polypropylene obtained by adding, as a neutralizer, calcium stearate in an amount of 166 ppm (Comparative Example 1), 102 ppm (Comparative Example 2) or 52 ppm (Comparative Example 3), based on the total weight of the fiber of both core and shell materials, or adding the most general hydrotalcite-like compound (DHT-4A, trade name, product of Kyowa Chemical Industry Co., Ltd.) represented by the general formula

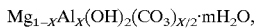
$Mg_{1-X}Al_X(OH)_2(CO_3)_{X/2} \cdot mH_2O$, where X satisfies the relationship of $0<X\leq 0.5$ and m is an integer, in an amount of about 500 ppm (Example 1), about 100 ppm (Example 2) and about 1,000 ppm (Example 3) for the core material, respectively.

To the polyethylene used as the shell material, there were added a sulfur-based antioxidant: di-n-octadecyl 3,3'-thiodipropionate, a phenolic antioxidant: 1,3,5-tris(4-tert-butyl-3-hydroxy-2,6-dimethylbenzyl)-1,3,5-triazine-2,4,6-(1H,3H,5H)-trione, and a phosphorus-based antioxidant: tris(2,4-di-tert-butylphenyl)phosphite within a range of from 500 to 1,000 ppm as antioxidants in addition to the neutralizer.

To each polypropylene used as the core material, there were added a sulfur-based antioxidant: dimyristyl 3,3'-thiodipropionate, a phenolic antioxidant: 2-tert-butyl-6-(3-tert-butyl-2-hydroxy-5-methylbenzyl)-4-methylphenyl acrylate, and a phosphorus-based antioxidant: bis(2,4-di-tert-butylphenyl)pentaerythritol diphosphite within a range of from 500 to 1,000 ppm as antioxidants in addition to the neutralizer.

The ink-absorbing members were received in a case body of an ink tank made of denatured PPE (NORIL, trade name, product of GE Plastics Co.) to form the ink tank, and respective inks were then charged into the ink-absorbing members. In the ink tank there was not used calcium stearate. An ink-jet head equipped with an ink ejection structure was then fitted to the ink tank to produce an ink cartridge.

The ink cartridge was heated at a temperature of 70° C. for 24 hours so as to facilitate the dissolving-out of the additives from the ink-absorbing members into the respective inks. The inks in which the additives had been dissolved out were drawn out up to the respective ink ejection orifices of the ink cartridge and left standing at ordinary temperature for 10 days, as they are, without capping on the ink ejection orifices. After that manner, water in the inks are evaporated in the vicinity of the ink ejection orifices, so that if impurities becoming a problem are dissolved out in the inks from the ink-absorbing members, the impurities should be deposited about the ink ejection orifices. The results are shown in Table 1.

TABLE 1

| | Neutralizer | Results of investigation | |
|---|---|---|---|
| | | Impurities deposited about ink ejection orifice | Deterioration of print quality due to the impurities |
| Ex. 1 | Hydrotalcite-like compound, 500 ppm | No problem arose | A |
| Ex. 2 | Hydrotalcite-like compound, 100 ppm | No problem arose | A |
| Ex. 3 | Hydrotalcite-like compound, 1,000 ppm | No problem arose | A |
| Comp. Ex. 1 | Calcium stearate, 166 ppm | Impurities were recognized | C |
| Comp. Ex. 2 | Calcium stearate, 102 ppm | Impurities were recognized | C |
| Comp. Ex. 3 | Calcium stearate, 52 ppm | Impurities were recognized | B |

(Note)
A: No defective ink-droplet impact occurred as a whole.
B: Defective ink-droplet impact partially occurred.
C: Defective ink-droplet impact occurred as a whole.

From the results shown in Table 1, it is understood that the samples obtained by adding calcium stearate to the core material causes the deterioration of print quality, and so the calcium stearate is dissolved out in the inks through the polyethylene as the shell material. This is considered to be attributable to the fact that the polyethylene as the shell material is melted by heat, whereby the polypropylene as the core material is exposed, and so calcium stearate is dissolved out in the inks from that part, or whereby the crystallinity of the polyethylene is decayed, and so calcium stearate is dissolved out in the inks through between polyethylene crystals decayed. Namely, it is understood that if a polyolefin obtained by adding calcium stearate is used as a part of an ink-absorbing member, there is a possibility that the calcium stearate may be dissolved out in an ink through a material situated thereabouts to deteriorate the print quality.

Taking the amount of calcium stearate added into consideration, first of all, in the case where the amount of calcium stearate added is 102 ppm or more, the deterioration of print quality due to impurities deposited about the ink ejection orifices occurs. With respect to the sample in which calcium stearate is added in an amount of 52 ppm, the deterioration of print quality due to impurities deposited about the ink ejection orifices is also recognized though the degree of deterioration is reduced. It seems that the degree of deterioration is reduced by decreasing the amount of calcium stearate added. However, when the amount of the neutralizer added is too decreased as against a catalyst residue which is said to be contained in an amount of generally from 30 to 300 ppm, the neutralizing action is not sufficiently performed, namely, there is a possibility of causing a problem that the catalyst residue remains in the polymer, and so the polymer is corroded.

As described above, it is understood that the use of the polyolefin obtained by adding calcium stearate as a neutralizer in the ink-contacting members is not preferred irrespective of the amount added. On the contrary, it is understood that the sample according to the present invention, which is obtained by using the hydrotalcite-like compound as a neutralizer, causes no problem of deteriorating the print quality due to impurities deposited about the ink ejection orifices, and so such a sample is an ink-contacting member having excellent resistance to contact with inks.

The material for the ink-absorbing members is not limited to the composite fiber of the core-shell structure composed of at least two polyolefins as described in the above Examples. At least two materials may be separately formed into fibers, and these fibers may be mixed before use. It goes without saying that the compositional ratio of the two materials is also not limited to 1:1. Alternatively, a single fiber composed of one material may be used so as to fusion-bond by itself. The present invention is also not limited to the structure that one material is used as an adhesive by heating it at a prescribed temperature to fix three-dimensionally interlocking intersections of the fibers formed of the other material, thereby generating strength.

The material for forming the ink-absorbing members and the like may be composed of only one material, and its structure may also be in the form of a nonwoven fabric such as the conventionally-known felt. Besides, there may be adopted a structure that fibers composed of a polyolefinic material, with which ink-absorbing members and the like are constructed, are linearly bundled as disclosed in, for example, Japanese Patent Application Laid-Open No. 5-8405. Such a structure is effective for both ink-feeding ability and decrease in ink residue remaining in an ink tank.

The present invention has hereinbefore been explained by the Examples. However, the present invention is not limited to the above-described ink-absorbing members and may also be applied to other ink-contacting members which come into contact with inks in the course of an ink feed line in an ink-jet recording apparatus. Namely, in an ink-jet recording apparatus illustrated in FIG. 4, an ink container bag 42a, an ink tube 48 and a container for directly receiving an ink, such as a subtank 47, with which an ink to be fed to a recording head comes into contact, can also be formed from a polyolefin obtained by adding the hydrotalcite-like compound as a neutralizer for a catalyst residue upon polymerization, thereby achieving the same effect as in Examples 1 to 3. The ink container bag, ink tube and container for directly receiving an ink are also not limited to the forms illustrated in FIG. 4, and the present invention may be applied to various other forms.

According to the present invention, as described above, there can be provided ink-contacting members such as ink-absorbing members, ink tanks and ink cartridges, which cause no problem of dissolving out impurities therefrom upon contact with an ink to deteriorate the print quality, and have an excellent resistance to contact with inks.

What is claimed is:

1. An ink-contacting member used in an ink-jet recording apparatus, which comprises, as a principal component, a polyolefin obtained by adding a hydrotalcite-like compound as a neutralizer.

2. The ink-contacting member according to claim 1, wherein the hydrotalcite-like compound is represented by a general formula

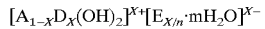

wherein A is a divalent metal, D is a trivalent metal, E is an anion, n is a valency of the anion, m is an integer, and X satisfies the relationship of $0 < X \leq 0.5$.

3. The ink-contacting member according to claim 2, wherein the hydrotalcite-like compound is represented by a general formula $$Mg_{1-x}Al_x(OH)_2(CO_3)_{x/2} \cdot mH_2O$$

wherein X satisfies the relationship of $0<X\leq0.5$ and m is an integer.

4. The ink-contacting member according to any one of claims 1 to 3, wherein the polyolefin is polypropylene or polyethylene.

5. An ink-absorbing member capable of holding an ink to be fed to an ink-jet head therein, which comprises, as a principal component, a polyolefin obtained by adding a hydrotalcite-like compound as a neutralizer.

6. The ink-absorbing member according to claim 5, wherein the hydrotalcite-like compound is represented by a general formula $$[A_{1-x}D_x(OH)_2]^{x+}[E_{x/n} \cdot mH_2O]X-$$

wherein A is a divalent metal, D is a trivalent metal, E is an anion, n is a valency of the anion, m is an integer, and X satisfies the relationship of $0<X\leq0.5$.

7. The ink-absorbing member according to claim 6, wherein the hydrotalcite-like compound is represented by a general formula $$Mg_{1-x}Al_x(OH)_2(CO_3)_{x/2} \cdot mH_2O$$

wherein X satisfies the relationship of $0<X\leq0.5$ and m is an integer.

8. The ink-absorbing member according to any one of claims 5 to 7, wherein the polyolefin is polypropylene or polyethylene.

9. The ink-absorbing member according to any one of claims 5 to 7, wherein the ink-absorbing member is composed of an aggregate of polyolefin fibers.

10. The ink-absorbing member according to any one of claims 5 to 7, wherein the ink-absorbing member is formed by laminating at least two fiber masses.

11. The ink-absorbing member according to any one of claims 5 to 7, wherein the ink-absorbing member is formed with at least two fibrous materials different in melting point from each other.

12. An ink tank comprising an ink-absorbing member capable of holding an ink therein, and a case body housing the ink-absorbing member therein and having an opening part communicating with the air, wherein the ink-absorbing member comprises, as a principal component, a polyolefin obtained by adding a hydrotalcite-like compound as a neutralizer.

13. The ink tank according to claim 12, wherein the ink-absorbing member has an external surface equivalent or corresponding to the configuration of the interior of the case body and is formed by compressing a fibrous material and thermosetting at least its surface.

14. The ink tank according to claim 12, wherein the hydrotalcite-like compound is represented by a general formula $$[A_{1-x}D_x(OH)_2]^{x+}[E_{x/n} \cdot mH_2O]^{x-}$$

wherein A is a divalent metal, D is a trivalent metal, E is an anion, n is a valency of the anion, m is an integer, and X satisfies the relationship of $0<X\leq0.5$.

15. The ink tank according to claim 14, wherein the hydrotalcite-like compound is represented by a general formula $$Mg_{1-x}Al_x(OH)_2(CO_3)_{x/2} \cdot mH_2O$$

wherein X satisfies the relationship of $0<X\leq0.5$ and m is an integer.

16. The ink tank according to any one of claims 12 to 14, wherein the polyolefin is polypropylene or polyethylene.

17. The ink tank according to any one of claims 12 to 14, wherein the ink-absorbing member and the case body are composed of homogeneous materials.

18. An ink-jet cartridge comprising an ink-absorbing member capable of holding an ink therein, an fink tank housing the ink-absorbing member therein, and a Printing head for ejecting the ink to be fed from the ink tank, wherein the ink-absorbing member comprises, as a principal component, a polyolefin obtained by adding a hydrotalcite-like compound as a neutralizer.

19. The ink-jet cartridge according to claim 18, wherein the hydrotalcite-like compound is represented by a general formula $$[A_{1-x}D_x(OH)_2]^{x+}[E_{x/n} \cdot mH_2O]^{x-}$$

wherein A is a divalent metal, D is a trivalent metal, E is an anion, n is a valency of the anion, m is an integer, and X satisfies the relationship of $0<X\leq0.5$.

20. The ink-jet cartridge according to claim 19, wherein the hydrotalcite-like compound is represented by a general formula $$Mg_{1-x}Al_x(OH)_2(CO_3)_{x/2} \cdot mH_2O$$

wherein X satisfies the relationship of $0<X\leq0.5$ and m is an integer.

21. The ink-jet cartridge according to any one of claims 18 to 20, wherein the polyolefin is polypropylene or polyethylene.

22. An ink tank capable of storing an ink to be fed to an ink-jet head, wherein at least a part of the ink tank, with which an ink comes into contact, comprises, as a principal component, a polyolefin obtained by adding a hydrotalcite-like compound as a neutralizer.

23. The ink tank according to claim 22, wherein the hydrotalcite-like compound is represented by a general formula $$[A_{1-x}D_x(OH)_2]^{x+}[E_{x/n} \cdot mH_2O]^{x-}$$

wherein A is a divalent metal, D is a trivalent metal, E is an anion, n is a valency of the anion, m is an integer, and X satisfies the relationship of $0<X\leq0.5$.

24. The ink tank according to claim 23, wherein the hydrotalcite-like compound is represented by a general formula $$Mg_{1-x}Al_x(OH)_2(CO_3)_{x/2} \cdot mH_2O$$

wherein X satisfies the relationship of $0<X\leq0.5$ and m is an integer.

25. The ink tank according to any one of claims 22 to 24, wherein the polyolefin is polypropylene or polyethylene.

26. An ink-jet recording apparatus comprising an ink-contacting member, wherein the ink-contacting member comprises, as a principal component, a polyolefin obtained by adding a hydrotalcite-like compound as a neutralizer.

27. The ink-jet recording apparatus according to claim 26, wherein the hydrotalcite-like compound is represented by a general formula $$[A_{1-X}D_X(OH)_2]^{X+}[E_{X/n} \cdot mH_2O]X-$$

wherein A is a divalent metal, D is a trivalent metal, E is an anion, n is a valency of the anion, m is an integer, and X satisfies the relationship of $0 < X \leq 0.5$.

28. The ink-jet recording apparatus according to claim 27, wherein the hydrotalcite-like compound is represented by a general formula $$Mg_{1-X}Al_X(OH)_2(CO_3)_{X/2} \cdot mH_2O$$

wherein X satisfies the relationship of $0 < X \leq 0.5$ and m is an integer.

* * * * *

UNITED STATES PATENT AND TRADEMARK OFFICE
CERTIFICATE OF CORRECTION

PATENT NO. : 6,698,871 B1
DATED : March 2, 2004
INVENTOR(S) : Hiroki Hayashi et al.

It is certified that error appears in the above-identified patent and that said Letters Patent is hereby corrected as shown below:

Column 2,
Line 18, "been" should be deleted; and
Line 21, "ease" should read -- easy --.

Column 3,
Line 32, "farther" should read -- further --.

Column 5,
Lines 3-4, "$Mg_4Al_2(OH)_{12}CO_3 \cdot 3H_2O + 2HCl \rightarrow Mg_4Al_2(OH)_{12}Cl_2 \cdot 3H_2O + H_2 + CO_2$" should read -- $Mg_4Al_2(OH)_{12}CO_3 \cdot 3H_2O + 2HCl \rightarrow Mg_4Al_2(OH)_{12}Cl_2 \cdot 3H_2O + H_2O + CO_2$ --

Column 6,
Line 50, "members." should read -- members --.

Column 11,
Line 20, "$[A_{1-x}D_x(OH)_2]^{x+}[E_{x/n} \cdot mH_2O]x$-" should read -- $A_{1-x}D_x(OH)_2]^{x+}[E_{x/n} \cdot mH_2O]^{x-}$ --.

Column 12,
Line 14, "fink" should read -- ink --; and
Line 15, "Printing" should read -- printing --.

Column 13,
Line 4, "$[A_{1-x}D_x(OH)_2]^{x+}[E_{x/n} \cdot mH_2O]x$-" should read -- $A_{1-x}D_x(OH)_2]^{x+}[E_{x/n} \cdot mH_2O]^{x-}$ --.

Signed and Sealed this

Twenty-seventh Day of July, 2004

JON W. DUDAS
*Acting Director of the United States Patent and Trademark Office*